US009822655B2

United States Patent
Beaujard et al.

(10) Patent No.: US 9,822,655 B2
(45) Date of Patent: Nov. 21, 2017

(54) ASSEMBLY FORMED BY A TURBINE NOZZLE OR A COMPRESSOR DIFFUSER MADE OF CMC FOR A TURBINE ENGINE AND BY AN ABRADABLE MATERIAL SUPPORT RING, AND A TURBINE OR A COMPRESSOR INCORPORATING SUCH AN ASSEMBLY

(75) Inventors: Antoine Jean-Philippe Beaujard, Melun (FR); Elric Georges Andre Fremont, Merignac (FR)

(73) Assignees: SNECMA, Paris (FR); HERAKLES, Le Haillan (FR)

( * ) Notice: Subject to any disclaimer, the term of this patent is extended or adjusted under 35 U.S.C. 154(b) by 819 days.

(21) Appl. No.: 14/343,257

(22) PCT Filed: Aug. 30, 2012

(86) PCT No.: PCT/FR2012/051958
§ 371 (c)(1),
(2), (4) Date: Mar. 6, 2014

(87) PCT Pub. No.: WO2013/034837
PCT Pub. Date: Mar. 14, 2013

(65) Prior Publication Data
US 2014/0227088 A1    Aug. 14, 2014

(30) Foreign Application Priority Data

Sep. 7, 2011   (FR) .................................... 11 57924

(51) Int. Cl.
*F01D 11/00* (2006.01)
*F01D 5/28* (2006.01)
(Continued)

(52) U.S. Cl.
CPC ............ *F01D 11/001* (2013.01); *F01D 5/282* (2013.01); *F01D 5/284* (2013.01); *F01D 11/122* (2013.01);
(Continued)

(58) Field of Classification Search
CPC .......... F01D 5/282; F01D 5/284; F01D 5/147; F01D 11/122; F01D 11/001;
(Continued)

(56) References Cited

U.S. PATENT DOCUMENTS 5,215,435 A * 6/1993 Webb ........................ F01D 5/08
                                                277/414
5,715,596 A   2/1998 Bintz
(Continued)

FOREIGN PATENT DOCUMENTS

| FR | 2 928 961 | 9/2009 | |
|----|-----------|--------|--|
| WO | WO 2010061140 A1 * | 6/2010 | ........... B29C 70/222 |
| WO | 2010/146288 | 12/2010 | |

OTHER PUBLICATIONS

International Search Report dated Oct. 24, 2012, in PCT/FR12/051958, filed Aug. 30, 2012.

*Primary Examiner* — Gregory Anderson
*Assistant Examiner* — Juan G Flores
(74) *Attorney, Agent, or Firm* — Oblon, McClelland, Maier & Neustadt, L.L.P.

(57) ABSTRACT

A turbine nozzle or a compressor diffuser includes sectors made of CMC material, each having an inner platform, an outer platform, and airfoils. An abradable material support ring is made up of sectors, each presenting upstream and downstream attachment tabs. Each inner platform presents on the inside an upstream hook and a downstream hook, and the abradable material support ring is supported by the nozzle or the diffuser by mutually engaging without fasten-
(Continued)

ing together firstly the end portions of the upstream attachment tabs and the upstream hooks and secondly the end portions of the downstream attachment tabs and the downstream hooks.

16 Claims, 7 Drawing Sheets

(51) Int. Cl.
*F01D 25/24* (2006.01)
*F01D 11/12* (2006.01)
*F01D 25/00* (2006.01)

(52) U.S. Cl.
CPC ......... *F01D 25/005* (2013.01); *F01D 25/246* (2013.01); *Y02T 50/672* (2013.01)

(58) Field of Classification Search
CPC .. F01D 25/005; F01D 25/246; F05D 2260/30; Y02T 50/672
See application file for complete search history.

(56) References Cited

U.S. PATENT DOCUMENTS

| | | |
|---|---|---|
| 5,749,701 A | 5/1998 | Clarke et al. |
| 7,635,251 B2* | 12/2009 | Duesler ................. F01D 11/001 415/160 |
| 8,221,060 B2* | 7/2012 | Slater .................... F01D 11/001 415/173.1 |
| 2011/0008163 A1 | 1/2011 | Prentice et al. |
| 2011/0052380 A1 | 3/2011 | Bariaud et al. |
| 2011/0311368 A1* | 12/2011 | Coupe .................. B29C 70/222 416/241 A |
| 2012/0099982 A1 | 4/2012 | Coupe et al. |

* cited by examiner

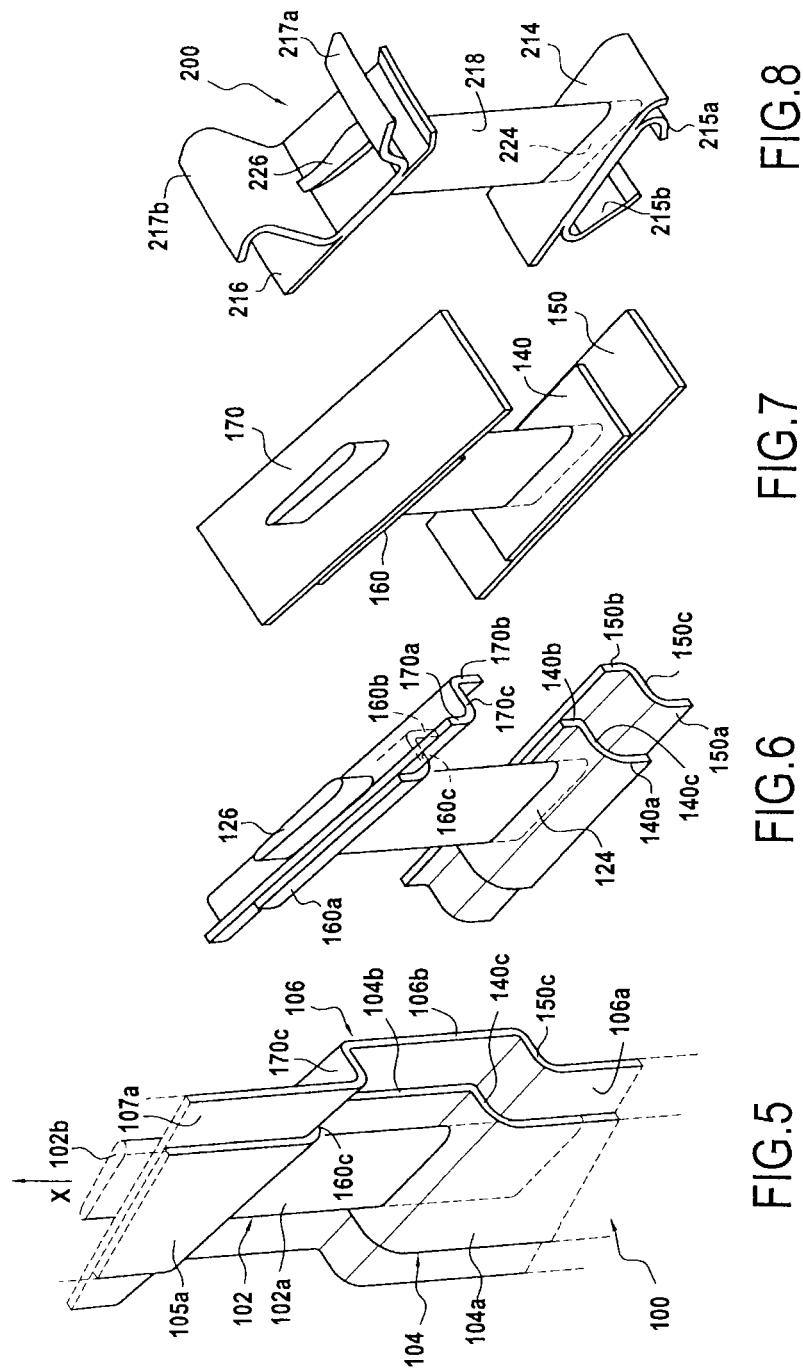

ASSEMBLY FORMED BY A TURBINE NOZZLE OR A COMPRESSOR DIFFUSER MADE OF CMC FOR A TURBINE ENGINE AND BY AN ABRADABLE MATERIAL SUPPORT RING, AND A TURBINE OR A COMPRESSOR INCORPORATING SUCH AN ASSEMBLY

BACKGROUND OF THE INVENTION

The invention relates to turbine engines, and in particular to aeroengines and to industrial turbines, more particularly to turbine nozzles and to compressor diffusers for such turbine engines.

Improving the performance of turbine engines and reducing their polluting emissions has led to envisaging ever higher operating temperatures.

For hot elements in turbine engines, proposals have therefore been made to use ceramic matrix composite (CMC) materials. Such materials possess remarkable thermostructural properties, i.e. mechanical properties that make them suitable for constituting structural elements, together with the ability to conserve those properties at high temperatures. Furthermore, CMC materials are of density that is considerably lower than the density of the metal materials conventionally used for elements in the hot portions of turbine engines.

Thus, documents WO 2010/061140, WO 2010/116066, and WO 2011/080443 describe making turbine engine rotor wheel blades out of CMC, the blades having inner and outer platforms incorporated therein. The use of CMC materials for turbine nozzles has also been proposed, in particular in document WO 2010/146288.

A conventional metal turbine nozzle is made up of a plurality of assembled-together sectors, each sector comprising an inner platform, an outer platform, and a plurality of airfoils extending between the inner and outer platforms and secured thereto. The inner and outer platforms define an annular flow passage for gas through the nozzle. On the inside, it is common practice to provide an abradable material carried by the inner platforms and co-operating with sealing wipers secured to a rotor of the turbine. The abradable material is typically in the form of a honeycomb metal structure.

When the turbine nozzle is made up of CMC sectors, there is a problem of attaching the abradable material.

A similar problem arises in compressor diffusers made up of CMC material sectors supporting an abradable material on the inside of inner platforms.

OBJECT AND SUMMARY OF THE INVENTION

An object of the invention is to provide a solution to this problem, and to this end the invention provides an assembly formed by a turbine nozzle or a compressor diffuser for a turbine engine and by a metal abradable material support ring, the turbine nozzle or compressor diffuser comprising a plurality of sectors, each having an inner platform, an outer platform, and airfoils extending between the inner platform and the outer platform and secured thereto, and the abradable material support ring being carried by the inner platforms of the sectors on the insides of the inner platforms, in which assembly:

the nozzle or diffuser sectors are made of ceramic matrix composite material;

the abradable material support ring is made of sectors, each presenting an upstream attachment tab and a downstream attachment tab extending outwards;

the inner platforms of the nozzle or diffuser sectors each present, on the inside, an upstream hook and a downstream hook extending inwards; and the ring supporting the abradable material is supported by the nozzle or the diffuser by mutually engaging without fastening together the end portions of the upstream attachment tabs and the upstream hooks and by mutually engaging without fastening together the end portions of the downstream attachment tabs and the downstream hooks.

Thus, the elements made of CMC material and of metal are in limited contact without being fastened together and the contact is between portions in the form of hooks and tabs that therefore present capacity for elastic deformation, thus making it possible to accommodate differential variations in dimensions that are of thermal origin.

Advantageously, the mutual engagement surfaces between the attachment tabs of the abradable material support ring sectors and the hooks of the nozzle or diffuser sectors form, in radial section, flange segments of a V-shaped profile. Differential variations in dimensions in the radial direction and in the axial direction can thus be compensated by sliding along the engagement surfaces. In addition, it is thus possible to obtain good centering for the abradable material support ring.

Preferably, the end portions of the attachment tabs of the abradable material support ring sectors form slideways in which the end portions of the hooks of the nozzle or diffuser sectors are engaged.

Also preferably, abutments are provided to limit in a circumferential direction the mutual engagement of the abradable material support ring sectors and the nozzle or diffuser sectors.

The invention also provides a turbine engine turbine comprising a turbine casing and at least one assembly as defined above formed by a turbine nozzle made of ceramic matrix composite material and by an abradable material support ring made of metal.

The invention also provides a turbine engine compressor comprising a compressor casing and at least one assembly as defined above formed by a compressor diffuser made of ceramic matrix composite material and by an abradable material support ring made of metal.

Advantageously, the outer platforms of the nozzle or diffuser sectors present attachment tabs that extend outwards from the outside of the outer platforms, whereby the assembly is supported in the nozzle or compressor casing.

BRIEF DESCRIPTION OF THE DRAWINGS

The invention can be better understood on reading the following description made by way of non-limiting indication and with reference to the accompanying drawings, in which:

FIGS. 5 to 8 are very diagrammatic views showing successive steps in a method of making a fiber preform for a nozzle vane such as that shown in FIG. 4;

DETAILED DESCRIPTION OF EMBODIMENTS

Figure 1:
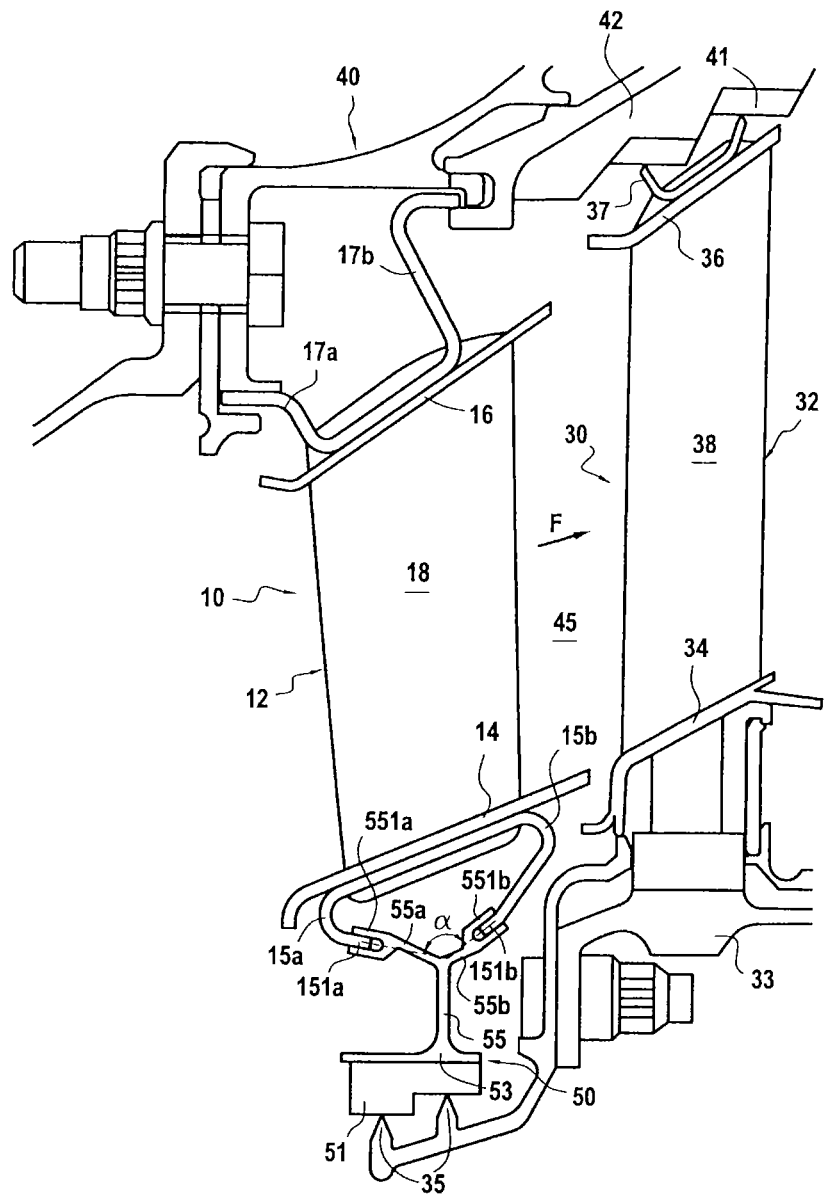
FIG. 1 is a highly diagrammatic fragmentary axial half-section view of a low pressure turbine of a turbine engine comprising an assembly made up of a turbine nozzle made of CMC material and of an abradable support ring made of metal in an embodiment of the invention.

A multi-stage low pressure (LP) turbine of a turbine engine, e.g. aeroengine, and as shown in part in FIG. 1, comprises a plurality of stationary nozzles 10 alternating with rotor wheels 30 in the flow direction of a gas stream through the turbine (arrow F) and mounted inside a turbine casing 40.

Each rotor wheel 30 has a plurality of blades 32 each having an inner platform 34, an outer platform 36, and an airfoil 38 extending between the platforms 34 and 36 and connected thereto. On the inside of the inner platform 34, each blade is extended by a root engaged in a housing in a disk 33. On the outside, the outer platform 36 carries wipers 37 facing an abradable material 41 carried by a sectorized ring 42 for providing sealing at the tips of the blades 32.

Throughout the present specification, the terms "inner" and "outer" are used with reference to a position or an orientation relative to the axis of the turbine.

The blades 32 may be conventional metal blades or they may be blades of CMC material, e.g. obtained as described in the above-mentioned documents WO 2010/061140, WO 2010/116066, or WO 2011/080443.

At least one of the nozzles, such as the nozzle 10 in FIG. 1, is formed by uniting a plurality of annular nozzle sectors made of CMC material.

Each nozzle sector 12 (FIGS. 1 and 2) comprises an inner platform 14, an outer platform 16, and a plurality of airfoils 18 extending between the platforms 14 and 16 and secured thereto. The outer faces of the platforms 14 and 34, and the inner faces of the platforms 16 and 36 define the annular passage 45 along which the gas stream flows through the turbine.

On the outside, projecting from the outer platform 16, there are an upstream attachment tab 17a and a downstream attachment tab 17b each in the form of an annular sector of substantially S-shaped section. The attachment tabs 17a, 17b extend over the same angle as the platform 16. The attachment tabs 17a, 17b and the platform 16 may be in radial alignment or they may be mutually offset a little in the circumferential direction to provide mutual overlap at the junctions between sectors. The terminal portions of the tabs 17a, 17b extend respectively upstream and downstream, and they are engaged in hooks carried by the casing 40 for the purpose of mounting the nozzle 10 in the casing 40 in a manner that is similar to mounting a metal turbine nozzle.

Throughout this specification, the terms "upstream" and "downstream" are used relative to the flow direction of the gas stream along the passage 45.

On the inside, an upstream hook 15a and a downstream hook 15b project under the inner platform 14, these hooks being in the form of annular sectors of substantially C-shaped section, the hook 15a being folded downstream while the hook 15b is folded upstream. In this example, the hooks 15a, 15b extend over the same angle as the platform 14.

The hooks 15a and 15b support and hold in axial position a sectorized metal ring 50 that supports on the inside an abradable material 51 facing wipers 35 carried by the disk 33 in order to provide the passage 45 with sealing on the inside. The hooks 15a, 15b and the platform 14 may be in radial alignment or they may be mutually offset a little in the circumferential direction to obtain mutual overlap at the junctions between sectors.

Figure 3:
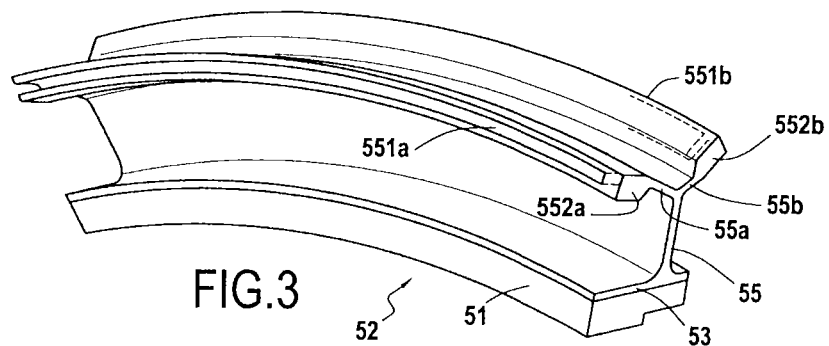
FIG. 3 is a diagrammatic perspective view of a sector of the abradable material support ring of FIG. 1.

The metal ring 50 is made of juxtaposed sectors 52 each constituting an abradable cartridge (FIGS. 1 and 3). In the example shown, each ring sector 52 comprises a base 53 from which there projects outwardly a portion 55 of substantially Y-shaped section terminating in upstream and downstream attachment tabs 55a and 55b. The attachment tabs 55a, 55b are in the form of annular sectors extending over the same angle as the ring sectors 52 and they are in radial alignment therewith. It should be observed that in a variant the portion 55 of the ring 50 may be of V-shaped section, i.e. it may comprise no more than the attachment tabs 55a, 55b, in particular when the space available on the inside of the nozzle sector 12 is smaller.

In the example shown, the mutual engagement between the hooks 15a and the attachment tabs 55a, and likewise between the hooks 15b and the attachment tabs 55b is performed by engaging the terminal portions 151a, 151b of the hooks 15a, 15b in respective slideways 551a, 551b formed at the ends of the attachment tabs 55a, 55b.

Engagement is performed by sliding in a circumferential direction until stop abutments come into contact so as to align a nozzle sector 12 radially with a ring sector 52. By way of example, the abutments are made by forming notches 152a, 152b at a circumferential end of the terminal portions 151a, 151b of the hooks 15a, 15b (FIG. 2) and closing the slideways 551a, 551b with solid portions 552a, 552b at a circumferential end of the attachment tabs 55a, 55b, the slideways not opening out at this end (FIG. 3). Naturally, other forms of circumferential stop abutments could be adopted. It would also be possible to provide an abutment only on the upstream hooks and attachment tabs, or only on the downstream hooks and attachment tabs.

In the example shown, the ring sectors 52 and the nozzle sectors 12 have the same angular dimension. In a variant, the angular dimension of the ring sectors could be a multiple or a fraction of the angular dimension of the nozzle sectors.

Advantageously, the mutual engagement surfaces between the terminal portion 151a of the hook 15a and the slideway 551a of the attachment tab 55a, and the mutual engagement surfaces between the terminal portion 151b of the hook 15b and the slideway 551b of the attachment tab 55b form, in radial section, rectilinear flange segments of a V-shaped profile, these segments forming between them an angle α (FIG. 1) that lies in the range 15° C. to 175°, for example. In addition, these mutual engagements are made without attachment between the hooks 15a, 15b and the tabs 55a, 55b. Thus, the connection between a nozzle sector 12 made of CMC material and a sector 52 of an abradable-material support ring made of metal takes place in such a manner as to be capable of accommodating differential variations in dimensions that are of thermal origin.

Figure 4:
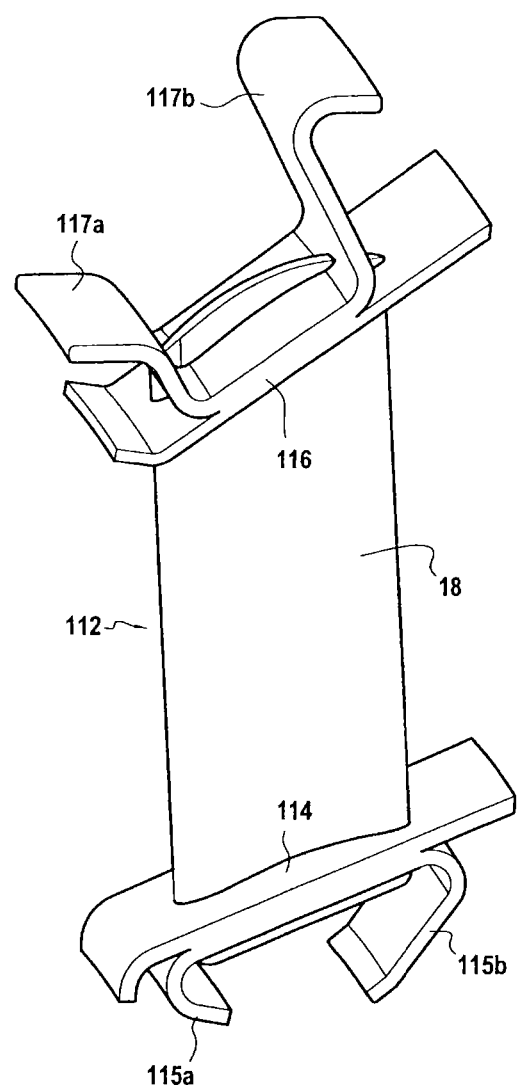
FIG. 4 is a perspective view of a single-airfoil nozzle vane unit forming part of the FIG. 2 nozzle sector.

The nozzle sectors 12 may be formed by assembling single-airfoil vane units 112 such as that shown in FIG. 4 and each comprising an inner platform 114, an outer platform 116, and a single airfoil 18 extending between the platforms 114 and 116 and secured thereto. On the inside, the platform 114 presents hooks 115a, 115b having the same profiles as the hooks 15a, 15b, respectively. On the outside, the platform 116 presents attachment tabs 117a, 117b having the same profiles as the tabs 17a, 17b, respectively.

There follows a description of a method of making a vane 112 such as that shown in FIG. 4. This method is similar to that described in document WO 2011/080443 for a blade of a turbine engine rotor wheel.

FIG. 5 shows very diagrammatically a fiber blank 100 from which a vane fiber preform can be shaped so that after it has been densified by a matrix and possibly also machined, a CMC material vane is obtained such as the vane 112.

The blank 100 comprises three portions 102, 104, and 106 obtained by three-dimensional weaving or multi-layer weaving, with only the envelopes of those three portions being shown in FIG. 5. After shaping, the portion 102 is to constitute a preform portion for the airfoil 18. After shaping, the portion 104 is to constitute the preform portions of the inner platform 114 and of the outer platform 116 that are to define the gas flow passage 45 inside the turbine. After shaping, the portion 106 is to constitute the preform portions for the hooks 115a, 115b and for the tabs 117a, 117b.

The three portions 102, 104, and 106 are in the form of woven strips extending generally in a direction X corresponding to the general direction of the vane to be made. By way of example, weaving is performed with warp yarns extending in the direction X; it being understood that weaving with weft yarns extending in this direction is also possible. In each of the portions 102, 104, and 106, the warp yarns are arranged in a plurality of layers that are interlinked at least in part by weft yarns in a plurality of layers of weft yarns. Various weaves may be used, e.g. interlock type weaves, multi-satin type weaves, or multi-plain type weaves. Reference may be made for example to document WO 2006/136755.

The fiber strip 102 is of varying thickness that is determined as a function of the profile of the airfoil of the vane to be made and of a width that is selected as a function of the (flat) developed length of the profile of the airfoil. The thickness of the fiber strip 102 is varied along its length by using warp yarns of varying weights, for example. In a variant, or in addition, it is possible to vary the thread count of the warp yarns (i.e. the number of yarns per unit length in the weft direction), with a smaller count enabling more pronounced thinning to be obtained when shaping the vane preform.

The fiber strips 104 and 106 are of thickness that is substantially constant and that is determined as a function of the thicknesses of the platforms 114, 116 of the vane that is to be made. The strip 104 is of a width corresponding to the longest of the flat developed profiles of the platforms 114, 116, while the strip 106 has a width corresponding to the longest of the flat developed profiles of the set of hooks 115a, 115b and the set of attachment tabs 117a, 117b. Each of the strips 104 and 106 has a first portion 104a, 106a that extends along and in the vicinity of a first face 102a of the strip 102, a second portion 104b, 106b that extends along and in the vicinity of the second face 102b of the strip 102, and a third portion 105a, 107a that extends along and in the proximity of the first face 102a of the strip 102. The strips 102 and 104 follow paths that are parallel without crossing each other.

The portions 104a and 104b of the strip 104 are connected together via connection portion 140c that crosses through the strip 102 at a location corresponding to the location of the inner platform of the vane that is to be made. Likewise, the portions 106a and 106b of the strip 106 are connected together by a connection portion 150c that crosses through the strip 102 and that is adjacent to or in the immediate proximity of the connection portion 140c.

The portions 104b and 105a of the strip 140 are connected together by a connection portion 160c that crosses through the strip 102 at a location corresponding to the location of the outer platform of the vane to be made. Likewise, the portions 106b and 107a of the strip 106 are connected together by a connection portion 170b that crosses through the strip 102 and that is adjacent to or in the immediate proximity of the connection portion 160c.

In the example described, the connection portions 140c, 150c, 160c, and 170c pass through the strip 102 at non-zero angles relative to a plane normal to the direction X, so as to comply with the shape of the vane to be made at its inner and outer platforms. The strips 102, 104, and 106 are woven simultaneously, without interlinking between the strip 102 and the portions 104a, 104b, and 105a of the strip 104, without interlinking between the strip 102 and the portions 106a, 106b, and 107a of the strip 106, and without interlinking between the strips 104 and 106. Advantageously, a plurality of successive blanks 100 may be woven continuously in the direction X. It is also possible to weave a plurality of parallel rows of blanks 100 simultaneously.

FIGS. 6 to 8 are very diagrammatic and show how a fiber preform 200 having a shape close to the shape of the vane 112 to be made (FIG. 4) can be obtained from a blank 100.

The fiber strip 102 is cut at one end upstream from the connection portions 140c, 150c so as to form an extra length 124 and it is cut at another end behind the connection portions 160c, 170c so as to form an extra length 126, the extra lengths 124 and 126 contributing to holding the connection portions 140c, 160c in position where they cross through the fiber strip 102.

The fiber strips 104 and 106 are cut to leave remaining segments 140a and 140b on either side of the connection portion 140c, segments 150a, 150b on either side of the connection portion 150c, segments 160a, 160b on either side of the connection portion 160c, and segments 170a, 170b on either side of the connection portion 170c, as shown in FIG. 6. The lengths of these segments 140a, 140b, 160a, and 160b are selected as a function of the developed lengths of the inner and outer platforms of the vane to be made for defining the gas flow passage. The lengths of the segments 150a, 150b, 170a, and 170b are selected as a function of the developed lengths of the hooks and of the attachment tabs that are presented by the inner and outer platforms of the vane 112 to be made.

Because there is no interlinking with the strip 102, the segments 140a, 140b, and 160a, 160b of the strip 104 can be folded out to form plates 140, 160, while the segments 150a, 150b, and 170a, 170b of the strip 106 can be folded out to form plates 150, 170, as shown in FIG. 7.

The fiber preform 200 (FIG. 8) of the vane 112 to be made (FIG. 4) is then obtained by molding in shaping tooling, with the strip 102 being deformed so as to obtain the profile of the vane airfoil 18, with the plates 140, 160 being deformed so as to reproduce shapes similar to the shapes of the platforms 114, 116 of the vane in their portions defining the gas flow passage, and with the plates 150, 170 being deformed to reproduce shapes similar to those of the hooks 115a, 115b and of the tabs 117a, 117b. This produces (FIG. 8) a vane preform 200 with inner and outer platform preform portions 214, 216, with hook preform portions 215a, 215b, with attachment tab preform portions 217a, 217b, and with an airfoil preform portion 218.

Figure 9:
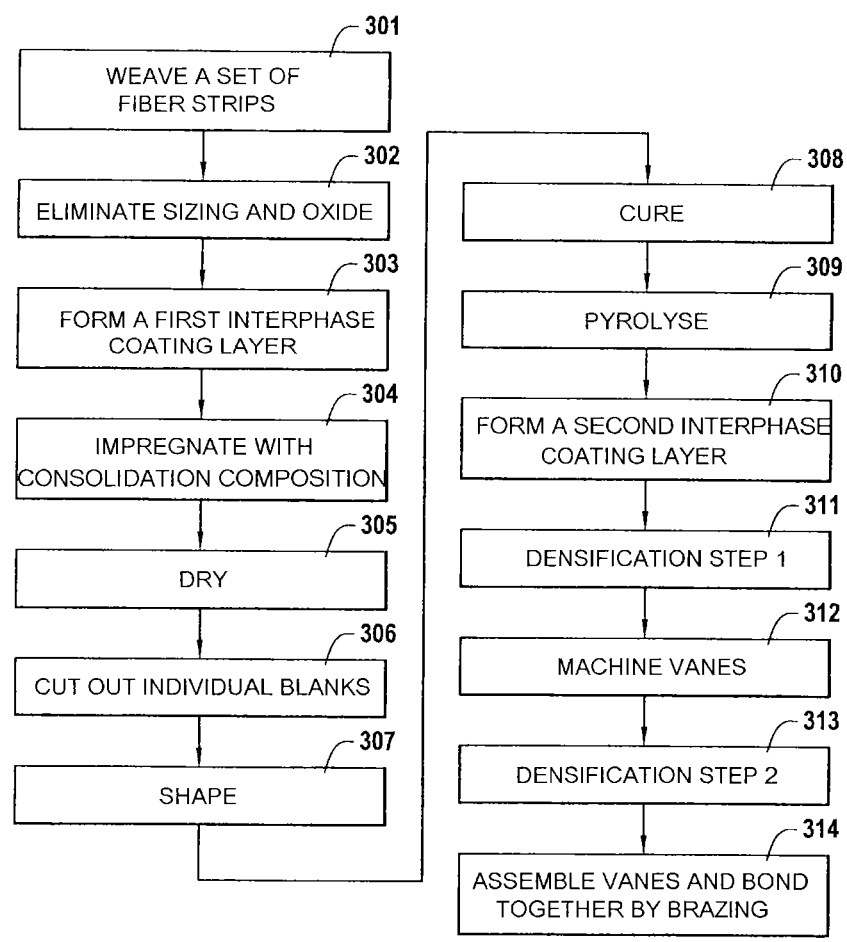
FIG. 9 shows the successive steps of a method of fabricating a nozzle sector such as that shown in FIG. 2.

It should be observed that the step of making the vane preforms 200 from the blank 100 are advantageously performed after treatment of the fibers of the blank 100 and after the blank has been impregnated with a consolidation composition as described below with reference to FIG. 9, which shows the successive steps of an implementation of a method enabling a multi-airfoil nozzle sector to be made out of CMC material.

In step 301, a set of fiber strips is woven by three-dimensional weaving, the step comprising a plurality of fiber blanks 100 extending in the warp direction, for example, as shown in FIG. 5. The weaving may be performed using ceramic yarns, in particular yarns based on silicon carbide (SiC), e.g. those supplied under the name "Nicalon" by the Japanese supplier Nippon Carbon. It is possible to use other ceramic yarns, in particular yarns made of refractory oxide, such as yarns based on alumina $Al_2O_3$, in particular for CMC materials of the oxide/oxide type (fiber reinforcement fibers and matrix both made of refractory oxide). It is also possible to use carbon fibers for a CMC material having carbon fiber reinforcement.

In step 302, the set of fiber strips is treated so as to eliminate the sizing present on the fibers and so as to eliminate the presence of oxide at the surfaces of the fibers. The sizing may be eliminated by heat treatment and the oxide may be eliminated by acid treatment.

In step 303, a thin layer of embrittlement relief interphase coating is formed on the fibers in the set of fiber strips by chemical vapor infiltration (CVI). By way of example, the interphase material may be pyrolytic carbon PyC, boron nitride BN, or boron-doped carbon BC. The thickness of the layer that is formed may lie for example in the range 10 nanometers (nm) to 100 nm in order to conserve a capacity for deformation in the fiber blank.

Steps of eliminating sizing, of acid treatment, and of forming an interphase coating on a substrate of SiC fibers are described in document U.S. Pat. No. 5,071,679.

In step 304, the set of fiber strips is then impregnated with a consolidation composition, typically a carbon-precursor resin or a ceramic-precursor resin, possibly diluted in a solvent.

After drying (step 305), the individual fiber blanks are cut (step 306) as shown in FIG. 6.

In step 307, a blank as cut in this way is shaped (as shown in FIGS. 7 and 8) and placed in tooling, e.g. made of graphite, for shaping the preform portions corresponding to the airfoil, to the platforms, and to the attachment tabs and the hooks.

Thereafter, the resin is cured (step 308) and then pyrolyzed (step 309), with it being possible for curing and pyrolyzing to follow on one after another by progressively raising the temperature inside the tooling.

After pyrolyzing, a vane preform is obtained that is consolidated by the pyrolysis residue. The quantity of consolidation resin is selected to be sufficient but not excessive so as to ensure that the pyrolysis residue bonds the fibers of the preform sufficiently to enable the preform to be handled while conserving its shape without assistance from tooling.

A second embrittlement relief interphase coating layer is formed by CVI, e.g. made of PyC, BN, or BC, with a thickness that is preferably not less than 100 nm (step 310). Making an interphase coating as two layers before and after consolidation is described in document EP 2 154 119.

Thereafter, the consolidated preform is densified with a ceramic matrix, e.g. by CVI. The matrix may be of SiC or it may be a self-healing matrix comprising matrix phases of pyrolytic carbon PyC, of boron carbide $B_4C$, or of a ternary Si—B—C system as described in particular in documents U.S. Pat. No. 5,246,756 and U.S. Pat. No. 5,965,266. As mentioned above, other types of ceramic matrix may be envisaged, in particular matrices made of refractory oxide, e.g. of alumina, in particular for CMC materials of the oxide/oxide type. Densification may then be performed by a liquid technique, i.e. by impregnating using a ceramic matrix liquid precursor and then transforming the precursor by heat treatment, or by impregnating with a composition containing ceramic powder, with the matrix then being obtained by sintering.

Densification is preferably performed in two steps 311 and 313 separated by a step 312 of machining the vane to its desired dimensions. A vane is then obtained such as the vane 112 in FIG. 4.

Figure 2:
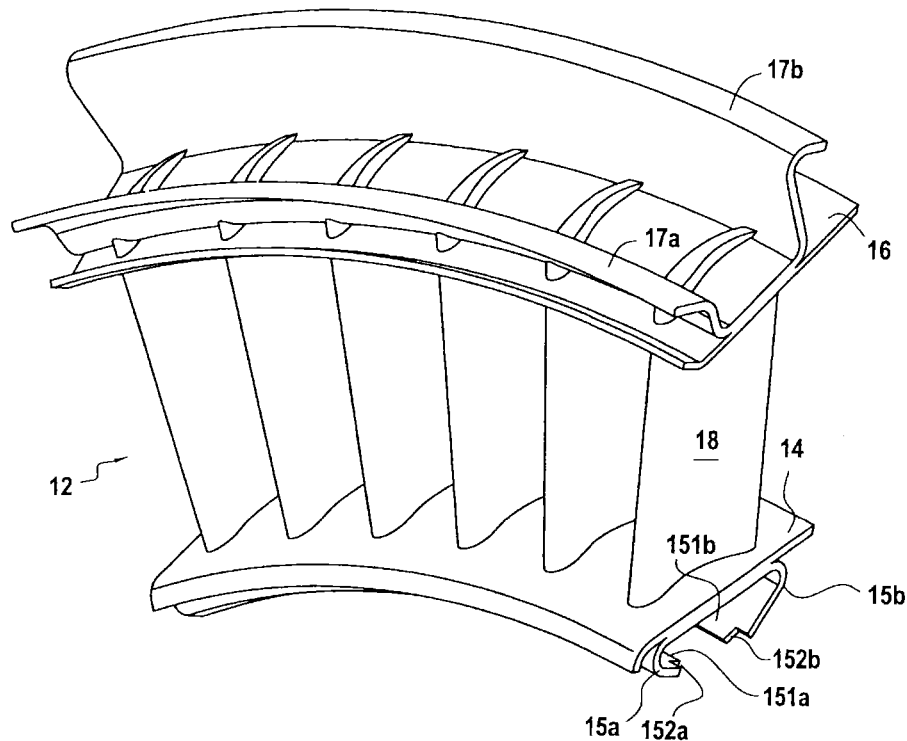
FIG. 2 is a diagrammatic perspective view of a sector of the FIG. 1 nozzle.

The following step 314 consists in uniting and connecting together a plurality of vanes to form a multi-airfoil nozzle sector made of CMC material such as the sector 12 in FIG. 2. The vanes are connected together by brazing. The use of brazing for connecting together parts made of CMC material, and in particular SiC material is known. Reference may be made for example to documents FR 2 664 518 and FR 2 745 808.

The notches 152a, 152b (FIG. 2) may be made during the machining step 312 in one of the vanes constituting a nozzle sector. In a variant, they may be made after the sector has been assembled.

The number of nozzle airfoils in the example of FIG. 2 is six. Naturally, this number could be greater or smaller.

After CMC material turbine nozzle sectors have been obtained, they are provided with sectors of the abradable-material support ring 50 as described above.

A complete turbine nozzle made of CMC material carrying an abradable-material support ring is then made up by mounting nozzle sectors 12 in the turbine casing by means of the attachment tabs 17a, 17b. The number of sectors making up a complete nozzle may lie in the range 16 to 40, for example.

Inter-sector sealing may optionally be improved by means of tongues arranged at the interfaces between adjacent nozzle sectors, as is already well known for nozzle sectors made of metal.

Above, vanes 112 are assembled together to form a nozzle sector 12 by juxtaposing substantially edge to edge the inner and outer platforms 114 and 116. In a variant, assembly may be performed with a small amount of overlap between adjacent edges of portions of the platforms 114 and 116 that define the passage 45, with the overlap being obtained by joggling to avoid affecting the shape of the passage.

Figure 10:
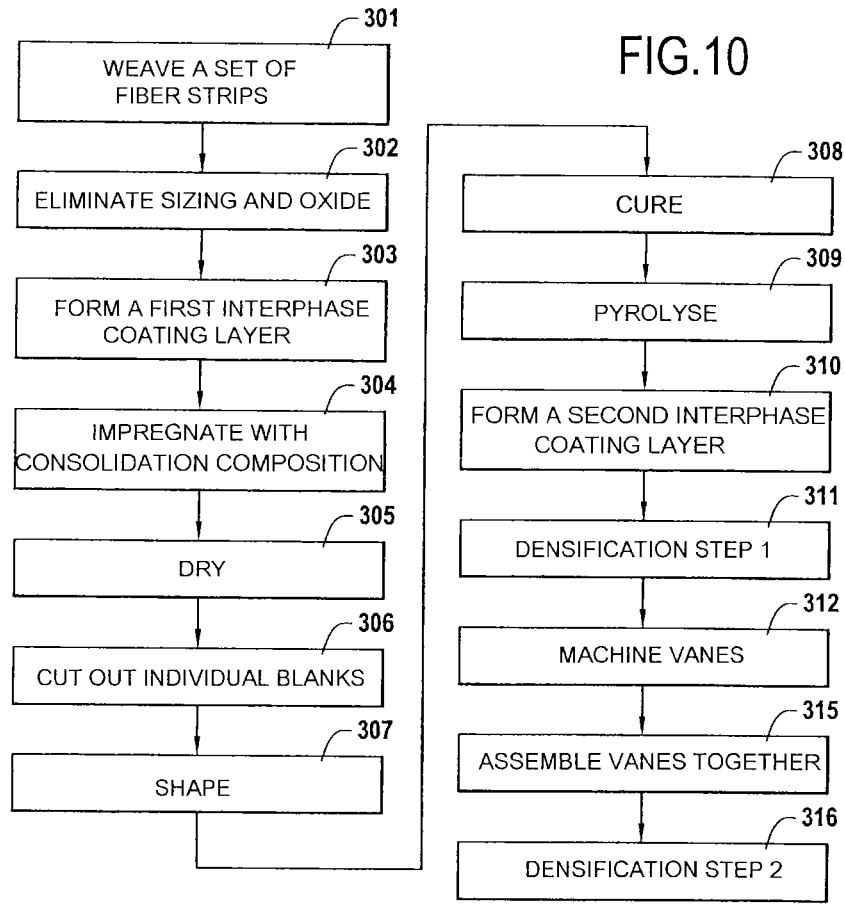
FIG. 10 shows the successive steps of another method of fabricating a nozzle sector such as that shown in FIG. 2.

FIG. 10 shows the successive steps of another method of fabricating a turbine nozzle sector out of CMC. Steps 301 to 312 are identical to those of the FIG. 9 method.

After the machining step 312, a plurality of vanes are held together to form a nozzle sector (step 315). The vanes are assembled together by means of tooling for holding the vanes side by side, and/or by pre-ceramic adhesive bonding, i.e. using a ceramic-precursor resin, e.g. a polysilane, a polysiloxane, a polysilazane, a polycarbosilane, or a silicone resin, in known manner. A second step of densification or of co-densification is performed on the assembled-together vanes (step 316) similar to the step 313 of the method of FIG. 9, but performed on a complete nozzle sector. When assembly has been performed by pre-ceramic adhesive bonding, the curing and the pyrolysis of the resin in order to transform it into ceramic may take place during the rise in temperature for performing the second densification step.

Figure 11:
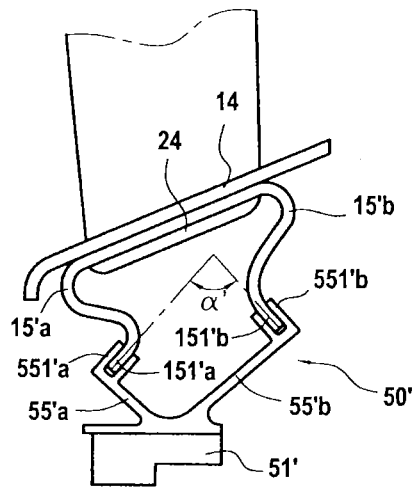
FIG. 11 is a fragmentary diagrammatic view in section showing a variant embodiment of the attachment of an abradable-support metal ring on a CMC turbine nozzle in another embodiment of the invention.

FIG. 11 shows a variant embodiment of the attachment of sectors of the abradable material support ring to the nozzle sectors made of CMC material. This variant differs from the embodiment of FIG. 1 by the shape of the upstream and downstream hooks 15'a and 15'b which project from the inner face of the inner platform 14 and by the shape of the upstream and downstream attachment tabs 55'a and 55'b of the ring sectors 50' supporting the abradable material 51'.

The hooks 15'a and 15'b have a section that is substantially S-shaped, the terminal portion 151'a of the hook 15'a pointing upstream while the terminal portion 151'b of the hooks 15'b points downstream.

The attachment tabs 55'a and 55'b are terminated by slideways 551'a, 551'b in which the terminal portions 151'a, 151'b of the hooks 15'a, 15'b are engaged without the hooks 15'a, 15'b being fastened to the tabs 55'a, 55'b.

The mutual engagement surfaces between the hooks 15'a, 15'b and the tabs 55'a, 55'b form, in radial section, rectilinear flange segments of a V-shaped profile, these segments forming between them an angle α'. The angle α' preferably lies in the range 15° to 175°.

The detailed description above relates to applying the invention to a low pressure turbine nozzle. Nevertheless, the invention is applicable to turbine nozzles made of CMC or turbine spools other than a low pressure spool, and also to compressor diffusers, in particular in compressor stages that are exposed in operation to high temperatures.

Figure 12:
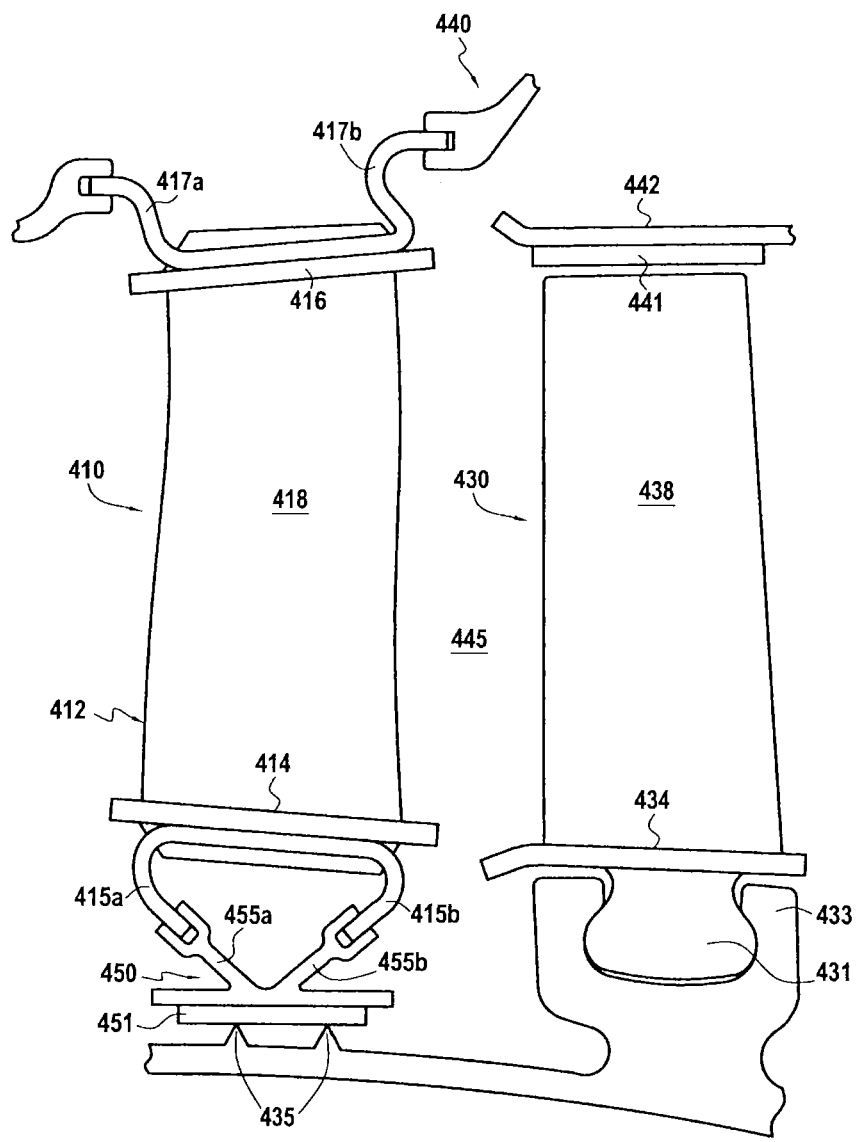
FIG. 12 is a very diagrammatic fragmentary axial half-section view of a turbine engine compressor comprising an assembly formed by a compressor diffuser made of CMC material and by an abradable-support metal ring in another embodiment of the invention.

A multistage compressor of a turbine engine, e.g. an aeroengine, is shown in part and in highly diagrammatic manner in FIG. 12. The compressor, e.g. a high pressure compressor, comprises a plurality of stator diffusers 410 alternating with rotor wheels 430 that are mounted in a compressor casing 440.

Each rotor wheel 430 has a plurality of blades 432 with an inner platform 434 secured to an airfoil 438. On the inside of the inner platform, each blade 432 is extended by a root 431 engaged in a housing in a rotor 433. At their outer ends, the airfoils 438 of the blades may present wipers (not shown) facing an abradable coating 441 carried by a sectorized ring 442 supported by the compressor casing.

At least one of the diffusers, e.g. the diffuser 410 of FIG. 12, is made by assembling together diffuser sectors 412 made of CMC material.

Each diffuser sector is made by assembling together single-airfoil unit vanes and comprises an inner platform 414, an outer platform 416, and an airfoil 418 extending between the platforms 414 and 416 and secured thereto.

The outer faces of the inner platforms 414 and the inner faces of the outer platforms 416 define the annular passage 445 for the flow of air in the compressor through the diffuser 410.

On the inside, each platform 414 presents hooks 415a, 415b, and on the outside, each platform 416 presents attachment tabs 417a, 417b.

The terminal portions of the attachment tabs 417a, 417b are engaged in hooks carried by the casing 440 in order to mount the diffuser sectors in the casing 440.

The hooks 415a and 415b support and hold in position a sectorized metal ring 450 that supports an abradable material 451 on its inside facing wipers 435 carried by the disk 443.

The metal ring 450 is made up of a plurality of juxtaposed sectors, e.g. extending over the same angle as its diffuser sectors and each constituting an abradable cartridge. In the same manner as for the ring 50 in the embodiment of FIGS. 1 and 3, each ring sector 450 presents attachment tabs 455a, 455b on the outside that form slideways at their ends into which the terminal portions of the hooks 415a, 415b are engaged without being fastened thereto, circumferential stop abutments being provided to align each ring sector 450 radially with a diffuser sector. Also as in the embodiment of FIGS. 1 and 3, the mutual engagement surfaces between the ends of the attachment tabs 455a, 455b and the ends of the hooks 415a, 415b form, in radial section, rectilinear flange segments of a V-shaped profile, forming between them an angle lying in the range 15° to 175°, for example.

The single-airfoil unit vanes constituting each diffuser sector are made and assembled together in the same manner as described above for the unit vanes 12 making up turbine nozzle sectors.

The invention claimed is:

1. An assembly formed by a turbine nozzle for a turbine engine and by a metal abradable material support ring, the turbine nozzle comprising a plurality of sectors, each of the sectors having an inner platform, an outer platform, and airfoils extending between the inner platform and the outer platform and secured thereto, and the abradable material support ring being carried by the inner platforms of the sectors on insides of the inner platforms, the assembly comprising:
   the nozzle sectors are made of ceramic matrix composite material;
   the abradable material support ring is made of sectors, each of the sectors of the abradable material support ring presenting an upstream attachment tab and a downstream attachment tab extending outwards;
   the inner platforms of the nozzle sectors each present, on the inside, an upstream hook and a downstream hook extending inwards; and
   the abradable material support ring supporting the abradable material is supported by the nozzle by mutually engaging without fastening together the end portions of the upstream attachment tabs and the upstream hooks and by mutually engaging without fastening together the end portions of the downstream attachment tabs and the downstream hooks,
   wherein the abradable material support ring comprises a base and a portion of Y-shaped extending from said base, wherein said portion terminating in upstream attachment tab and downstream attachment tab.

2. The assembly according to claim 1, wherein the end portions of the attachment tabs of the abradable material support ring sectors form slideways in which the end portions of the hooks of the nozzle sectors are engaged.

3. The assembly according to claim 1, wherein abutments are provided to limit in a circumferential direction the mutual engagement of the abradable material support ring sectors and the nozzle sectors.

4. A turbine engine turbine, comprising:
   a turbine casing; and
   at least one of the assembly according to claim 1, the at least one assembly being formed by a turbine nozzle made of ceramic matrix composite material and by an abradable material support ring made of metal.

5. The turbine according to claim 4, wherein the outer platforms of the nozzle sectors present attachment tabs that extend outwards from the outsides of the outer platforms, whereby said assembly is supported in the turbine casing.

6. An assembly formed by a turbine nozzle for a turbine engine and by a metal abradable material support ring, the turbine nozzle comprising a plurality of sectors, each of the sectors having an inner platform, an outer platform, and airfoils extending between the inner platform and the outer platform and secured thereto, and the abradable material support ring being carried by the inner platforms of the sectors on insides of the inner platforms, the assembly comprising:
- the nozzle sectors are made of ceramic matrix composite material;
- the abradable material support ring is made of sectors, each of the sectors of the abradable material support ring presenting an upstream attachment tab and a downstream attachment tab extending outwards;
- the inner platforms of the nozzle sectors each present, on the inside, an upstream hook and a downstream hook extending inwards; and
- the abradable material support ring supporting the abradable material is supported by the nozzle by mutually engaging without fastening together the end portions of the upstream attachment tabs and the upstream hooks and by mutually engaging without fastening together the end portions of the downstream attachment tabs and the downstream hooks,
- wherein the abradable material support ring is of K-shaped.

7. The assembly according to claim 6, wherein the end portions of the attachment tabs of the abradable material support ring sectors form slideways in which the end portions of the hooks of the nozzle sectors are engaged.

8. The assembly according to claim 6, wherein abutments are provided to limit in a circumferential direction the mutual engagement of the abradable material support ring sectors and the nozzle sectors.

9. A turbine engine turbine, comprising:
a turbine casing; and
at least one of the assembly according to claim 6, the at least one assembly being formed by a turbine nozzle made of ceramic matrix composite material and by an abradable material support ring made of metal.

10. The turbine according to claim 9, wherein the outer platforms of the nozzle sectors present attachment tabs that extend outwards from the outsides of the outer platforms, whereby said assembly is supported in the turbine casing.

11. An assembly formed by a turbine nozzle for a turbine engine and by a metal abradable material support ring, the turbine nozzle comprising a plurality of sectors, each of the sectors having an inner platform, an outer platform, and airfoils extending between the inner platform and the outer platform and secured thereto, and the abradable material support ring being carried by the inner platforms of the sectors on insides of the inner platforms, the assembly comprising:
- the nozzle sectors are made of ceramic matrix composite material:
- the abradable material support ring is made of sectors, each of the sectors of the abradable material support ring presenting an upstream attachment tab and a downstream attachment tab extending outwards;
- the inner platforms of the nozzle sectors each present, on the inside, an upstream hook and a downstream hook extending inwards; and
- the abradable material support ring supporting the abradable material is supported by the nozzle by mutually engaging without fastening together the end portions of the upstream attachment tabs and the upstream hooks and by mutually engaging without fastening together the end portions of the downstream attachment tabs and the downstream hooks,
- wherein the upstream hook and the downstream hook have a section that is S-shaped.

12. The assembly according to claim 11, wherein the mutual engagement surfaces between the attachment tabs of the abradable material support ring sectors and the hooks of the nozzle sectors form, in radial section, flange segments of a V-shaped profile.

13. The assembly according to claim 11, wherein the end portions of the attachment tabs of the abradable material support ring sectors form slideways in which the end portions of the hooks of the nozzle sectors are engaged.

14. The assembly according to claim 11, wherein abutments are provided to limit in a circumferential direction the mutual engagement of the abradable material support ring sectors and the nozzle sectors.

15. A turbine engine turbine, comprising:
a turbine casing; and
at least one of the assembly according to claim 11, the at least one assembly being formed by a turbine nozzle made of ceramic matrix composite material and by an abradable material support ring made of metal.

16. The turbine according to claim 15, wherein the outer platforms of the nozzle sectors present attachment tabs that extend outwards from the outsides of the outer platforms, whereby said assembly is supported in the turbine casing.

* * * * *